US011416058B2

United States Patent
Yang et al.

(10) Patent No.: US 11,416,058 B2
(45) Date of Patent: Aug. 16, 2022

(54) EFFICIENT DATA STORAGE USAGE ASSOCIATED WITH UNGRACEFUL SHUTDOWN

(71) Applicant: Western Digital Technologies, Inc., San Jose, CA (US)

(72) Inventors: Nian Niles Yang, Mountain View, CA (US); Sahil Sharma, San Jose, CA (US); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/184,533

(22) Filed: Feb. 24, 2021

(65) Prior Publication Data

US 2022/0129055 A1 Apr. 28, 2022

Related U.S. Application Data (60) Provisional application No. 63/106,544, filed on Oct. 28, 2020.

(51) Int. Cl.
*G06F 11/14* (2006.01)
*G06F 1/30* (2006.01)

(52) U.S. Cl.
CPC ............ *G06F 1/30* (2013.01); *G06F 11/1448* (2013.01); *G06F 2201/86* (2013.01)

(58) Field of Classification Search
CPC ..... G06F 1/30; G06F 11/1448; G06F 2201/86
See application file for complete search history.

(56) References Cited

U.S. PATENT DOCUMENTS

| 6,122,195 A | * | 9/2000 | Estakhri | G06F 12/0246 |
| | | | | 365/185.11 |
| 6,279,153 B1 | * | 8/2001 | Bi | H04L 67/06 |
| | | | | 717/171 |
| 9,558,839 B2 | | 1/2017 | Thompson et al. | |
| 9,933,963 B1 | * | 4/2018 | Alhussien | G06F 3/0679 |
| 10,013,194 B1 | * | 7/2018 | Yang | G06F 3/0619 |
| 10,109,361 B1 | | 10/2018 | Khakifirooz et al. | |
| 10,268,404 B2 | | 4/2019 | Alhussien et al. | |
| 10,593,412 B2 | * | 3/2020 | Miller | G11C 11/5628 |
| 2010/0064166 A1 | * | 3/2010 | Dubnicki | G06F 11/1076 |
| | | | | 714/4.1 |
| 2011/0153912 A1 | | 6/2011 | Gorobets et al. | |
| 2014/0269053 A1 | * | 9/2014 | Chen | G06F 3/0679 |
| | | | | 365/185.03 |

(Continued)

*Primary Examiner* — Kamini B Patel
(74) *Attorney, Agent, or Firm* — Patterson + Sheridan, LLP; Steven H. VerSteeg (57) ABSTRACT

The present disclosure generally relates to efficient block usage after ungraceful shutdown (UGSD) events. After a UGSD event, a host device is alerted by the data storage device that a QLC block that was being used prior to the UGSD event is experiencing an ongoing block recovery and that the block is not yet available to accept new data. The block is then checked to determine whether the block can continue to be used for the programming that was occurring at the time of the UGSD event. Once a determination is made, the data storage device notifies the host device so that normal operations may continue. Additionally, the amount of free blocks available for programming is monitored during UGSD events so that the host device can be warned if a power loss halt is triggered.

20 Claims, 4 Drawing Sheets

(56) References Cited

U.S. PATENT DOCUMENTS

| | | | |
|---|---|---|---|
| 2014/0359382 A1* | 12/2014 | Choi | G06F 11/2094 |
| | | | 714/710 |
| 2015/0149693 A1* | 5/2015 | Ng | G11C 16/10 |
| | | | 711/103 |
| 2016/0211014 A1* | 7/2016 | Lee | G11C 11/5628 |
| 2018/0101219 A1* | 4/2018 | Ross | G06F 1/3206 |
| 2018/0253240 A1* | 9/2018 | Alhussien | G06F 3/0659 |
| 2020/0027514 A1* | 1/2020 | Miller | G11C 29/52 |
| 2020/0034081 A1* | 1/2020 | Lee | G06F 3/0604 |
| 2020/0064897 A1 | 2/2020 | Nomura | |
| 2021/0074374 A1* | 3/2021 | Miller | G11C 16/3495 |

\* cited by examiner

EFFICIENT DATA STORAGE USAGE ASSOCIATED WITH UNGRACEFUL SHUTDOWN

CROSS-REFERENCE TO RELATED APPLICATIONS

This application claims benefit of U.S. provisional patent application Ser. No. 63/106,544, filed Oct. 28, 2020, which is herein incorporated by reference.

BACKGROUND OF THE DISCLOSURE

Field of the Disclosure

Embodiments of the present disclosure generally relate to efficient block usage after ungraceful shutdown (UGSD) events.

Description of the Related Art

Power loss is an issue with data storage devices, such as solid state drives (SSDs), where incompletely programmed blocks could pose a threat to data integrity and device reliability. Consecutive power loss events are particularly troublesome as the available memory blocks can be exhausted as the data storage device runs out of blocks for data storage, which will lead to the data storage device not being able to accept new data and be placed in an undesirable read only mode.

Capacitors have been used to handle power loss scenarios for state of the art data storage devices. The capacitors preserve enough power to help handle the power loss protection (PLP). The capacitors may not be sufficient. Even when there is some power reserve or capacitors or advanced power loss flags from the host device, consecutive power loss can still lead to the depletion of available blocks for the data storage device to operate normally.

At power recovery, the data storage device may choose a new block to write the data to while abandoning the original block because the original block will not be handled in time due to time-to-ready limitations. Thus, when the next power loss comes and goes, the data storage device will chose another block for data routing until sufficient power loss leads to the total depletion of the block counts.

Therefore, there is a need in the art for adequate and proper data storage device to host device communication during a UGSD/PLP recovery.

SUMMARY OF THE DISCLOSURE

The present disclosure generally relates to efficient block usage after ungraceful shutdown (UGSD) events. After a UGSD event, a host device is alerted by the data storage device that a QLC block that was being used prior to the UGSD event is experiencing an ongoing block recovery and that the block is not yet available to accept new data. The block is then checked to determine whether the block can continue to be used for the programming that was occurring at the time of the UGSD event. Once a determination is made, the data storage device notifies the host device so that normal operations may continue. Additionally, the amount of free blocks available for programming is monitored during UGSD events so that the host device can be warned if a power loss halt is triggered.

In one embodiment, a data storage device comprises: a non-volatile memory device; and a controller coupled to the non-volatile memory device, wherein the controller is configured to: detect a power loss event during a programming operation to a block; issue a block busy alert to a host device upon power up after the power loss event; determine whether the block can still be continuously programmed; and issue a block ready alert to the host device.

In another embodiment, a data storage device comprises: a non-volatile memory device; and a controller coupled to the non-volatile memory device, wherein the controller is configured to: determine power on after a power loss event; check remaining count of free blocks that can be used for subsequent power loss handling; determine whether remaining amount of free blocks is above or below a threshold; and either: continue handling a power loss data integrity check and usage; or issue a logical block address (LBA) warning for any incoming data from a host device.

In another embodiment, a data storage device comprises: a non-volatile memory device; means to determine whether a block can be continuously programmed after a power loss event; and means to issue a block-busy-alert to a host device after the power loss event.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to efficient block usage after ungraceful shutdown (UGSD) events. After a UGSD event, a host device is alerted by the data storage device that a QLC block that was being used prior to the UGSD event is experiencing an ongoing block recovery and that the block is not yet available to accept new data. The block is then checked to determine whether the block can continue to be used for the programming that was occurring at the time of the UGSD event. Once a determination is made, the data storage device notifies the host device so that normal operations may continue. Additionally, the amount of free blocks available for programming is monitored during UGSD events so that the host device can be warned if a power loss halt is triggered.

Figure 1:
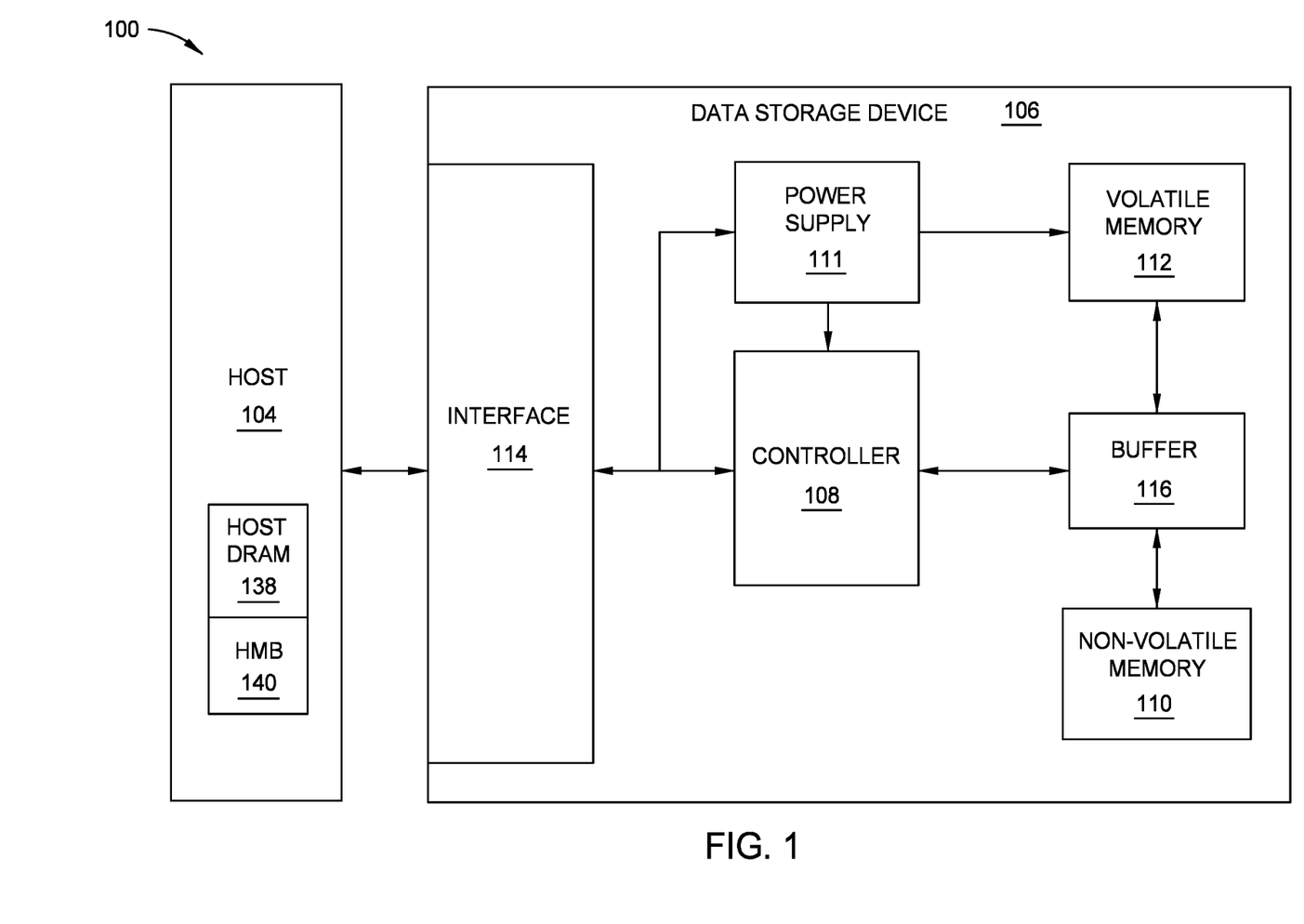
FIG. 1 is a schematic block diagram illustrating a storage system in which data storage device may function as a storage device for a host device, according to one embodiment.

FIG. 1 is a schematic block diagram illustrating a storage system 100 in which data storage device 106 may function as a storage device for a host device 104, according to one embodiment. For instance, the host device 104 may utilize a non-volatile memory (NVM) 110 included in data storage device 106 to store and retrieve data. The host device 104 comprises a host DRAM 138, where a portion of the host DRAM 138 is allocated as a host memory buffer (HMB) 140. The HMB 140 may be used by the data storage device 106 as an additional working area or an additional storage area by the data storage device 106. The HMB 140 may be inaccessible by the host device in some examples. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110. In some other embodiments, the HMB 140 may be utilized.

Figure 2:
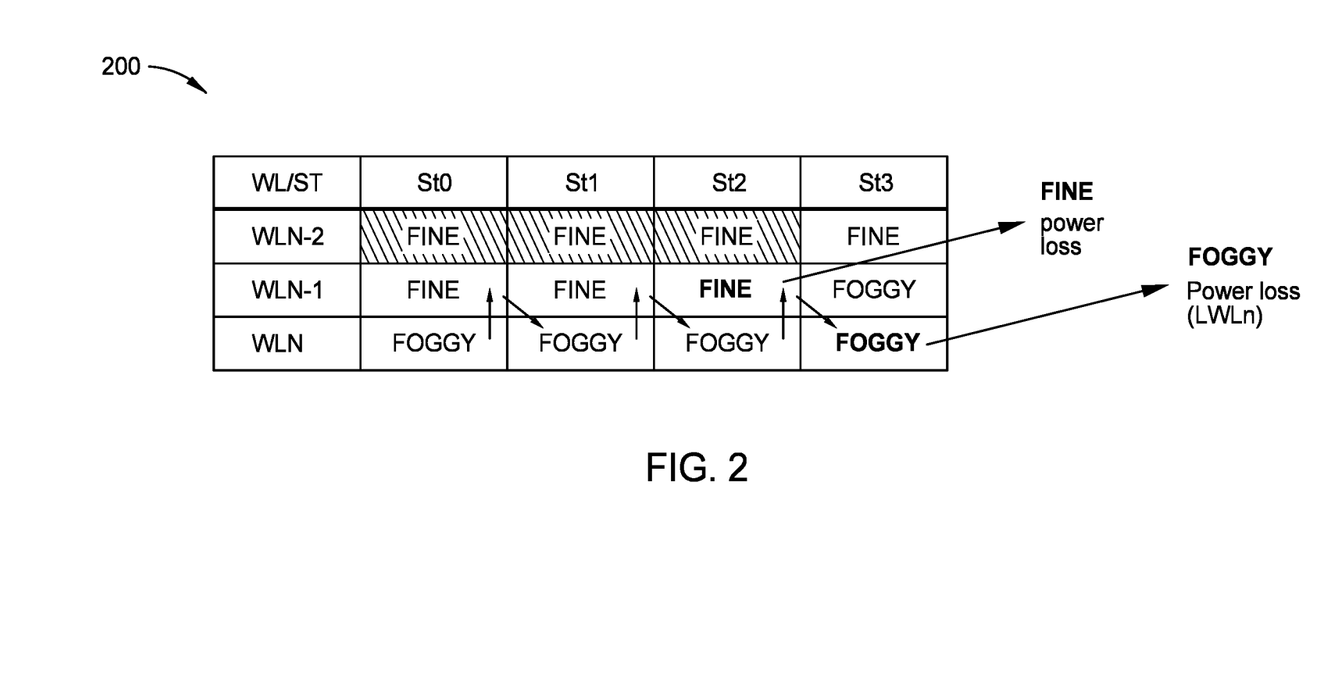
FIG. 2 is a schematic illustration of foggy-fine programming, according to one embodiment.

FIG. 2 is a schematic illustration of foggy-fine programming, according to one embodiment. When programming to the NVM 110, data is initially programmed to the SLC memory. After programming to the SLC memory, the data is then programmed to the QLC memory. The first program to the QLC memory is a foggy program. Foggy programming is where voltage pulses are provided to push the current state to a more resolved state, but not completely resolved state. After foggy programming to the QLC memory, the data is then fine programmed to the QLC memory. Fine programming is performed at a point in time after foggy programming to write the data again in the completely resolved state. The listed memories are not intended to be limiting, but to provide an example of a possible embodiment.

Regarding FIG. 2, the foggy-fine programming is implemented on a QLC memory block 200 of the NVM, such as the NVM 110 of FIG. 2. The QLC memory block 200 includes a plurality of wordlines, WLN, WLN-1, and WLN-2. The QLC memory block 200 further includes a plurality of strings, St0, St1, St2, and St3, such that each wordline of the plurality of wordlines includes the plurality of strings. For example, the WLN includes St0, St1, St2, and St3. Furthermore, the WLN, St0 may represent a memory block of the QLC memory block 200, where data is stored to and read from the memory block.

While programming to a memory block, the program may cause a voltage distribution shift or disturb the voltage of a memory block of an adjacent wordline, where the memory block of the adjacent wordline is previously programmed, which may cause bit errors to accumulate or bit flips to occur. For example, programming to the WLN St0 may disturb the voltage of the memory block of an adjacent wordline, WLN-1 St0. Therefore, when foggy-fine programming to the QLC memory block 200, the foggy-fine program may alternate between adjacent wordlines. For example, in FIG. 2, after foggy programming to the WLN St0, the WLN-1 St0 is fine programmed, where the WLN-1 St0 was previously foggy programmed. Unlike foggy programming, when fine programming to the memory block, the adjacent memory block that has been previously fine programmed, indicated by the diagonal pattern, may not be affected by the programming to the memory block. After fine programming WLN-1 St0, a foggy program occurs to the WLN St1.

During programming to the QLC memory block 200, a power loss event may occur. Examples of power loss events may include power surges, power outages, tripped breakers, short circuits, and the like. When a power loss event occurs, the data storage device, such as the data storage device 106 of FIG. 1, may include enough capacitors to program data from the volatile memory to the non-volatile memory. However, in some cases, the amount of power that the capacitors may store may not be enough to fully program all the data from the volatile memory to the non-volatile memory. When a power loss event occurs during a programming operation to the NVM, the controller, such as the controller 108 of FIG. 1, determines where the current program is occurring in the memory block. For example, in the QLC memory block 200, the controller may detect the power loss event during a fine program, such as the fine program to the WLN-1 St2 memory block, or during a foggy program, such as the foggy program to the WLN St3 memory block, where the controller determines where the current program is occurring.

Figure 3:
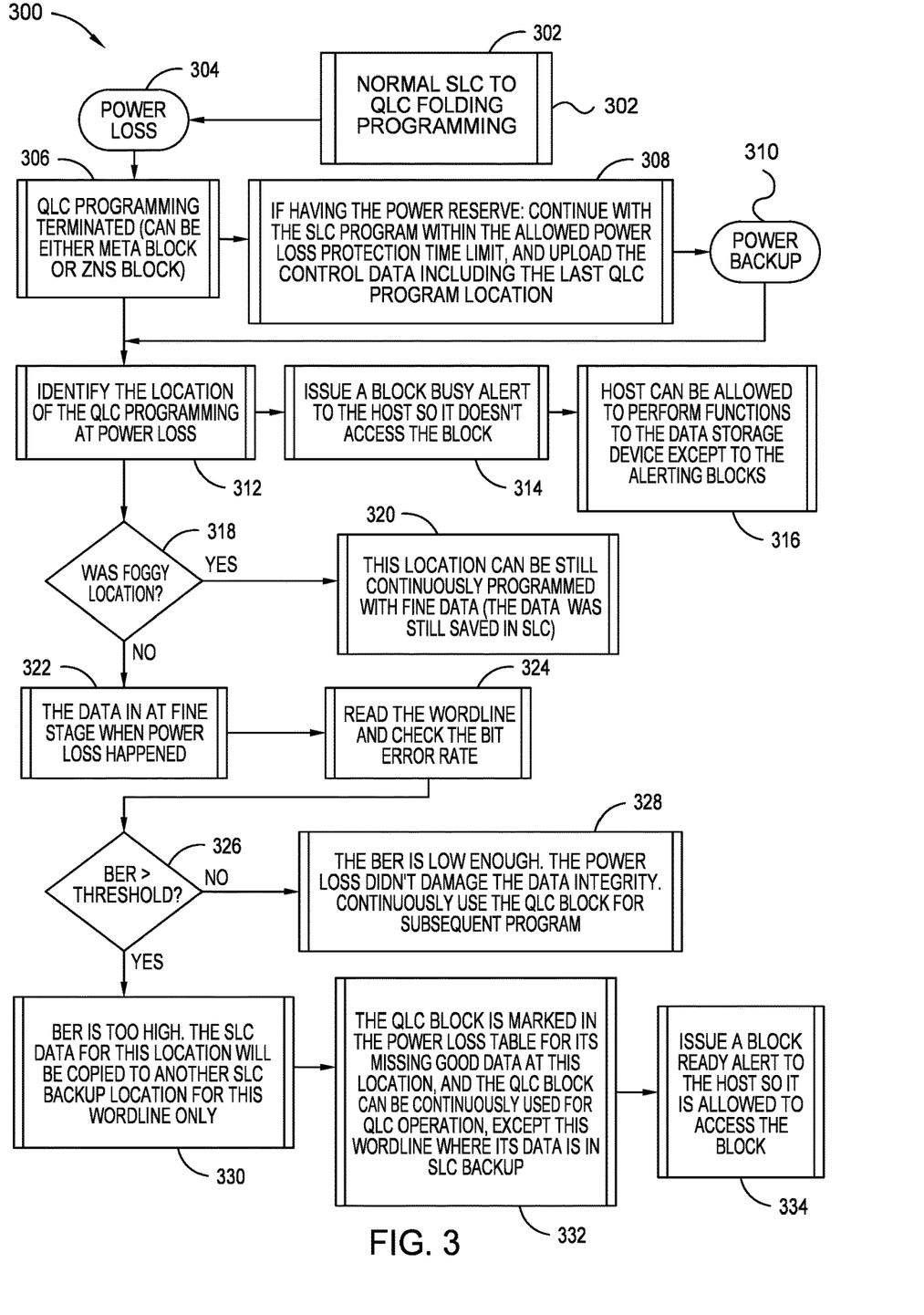
FIG. 3 is a flowchart of a method illustrating a power loss treatment for a data storage device, according to one embodiment.

FIG. 3 is a flowchart of a method 300 illustrating a power loss treatment for a data storage device, according to one embodiment. At block 302, programming to the QLC memory block occurs, such as the QLC memory block 200 of FIG. 2, by the SLC to QLC folding by first programming the host data to the SLC memory and then transferring the host data from the SLC memory to the QLC memory. At block 304, a power loss event, such as the UGSD, occurs, where the controller, such as the controller 108 of FIG. 1, detects the power loss event. At block 306, the QLC programming is terminated. QLC programming may be to a meta block across multiple dies or a zoned namespace (ZNS) block in a single die.

At block 308, if the data storage device includes enough power in the power reserve (i.e., the capacitors or an external power unit), the controller continues with the SLC program within the allowed power loss protection time limit, such as about 30 ms. The allowed power loss protection time limit may be a percentage of time of the total time that the capacitors may provide power to the data storage device. Furthermore, the control data including the last QLC program location is uploaded to the NVM at block 308. The control data may include SLC block information and the terminated QLC block information. The terminated QLC block information may include wordline information and the program stage, such as if the program terminated was a fine program or a foggy program. At block 310, power is restored to the data storage device.

At block 312, the controller identifies the location of the QLC programming when the power loss event occurred. For example, the location may be WLN-1 St2 of FIG. 2. At block 314, the controller issues a busy-block-alert to the host device, such as the host device 104 of FIG. 1. The busy-block-alert is a notification that a block recovery operation is occurring and the block associated with the block recovery operation is not yet ready to accept new data. The busy-block-alert may also inform the host device that the data belonging to the block associated with the block recovery operation and the data associated with the block stored in the SLC block is not to be modified. In other words, the data of the block, in any location of the data storage device, associated with the block recovery operation should not be changed by the host device during the block recovery operation. At block 316, the host device is able to perform functions to the data storage device, excluding the blocks associated with the busy-block-alert.

At block 318, the controller determines if the identified location at block 312 was a foggy program location. The controller checks the QLC program status on the last programmed location. The controller may check through multiple wordlines, sequentially, of the memory block to find the last programmed wordline and determine which wordline is the last foggy wordline and the last fine wordline. Furthermore, the last programmed location may also be stored in the SLC memory as part of the control data of block 308. If the location was a foggy program location at block 318, then at block 320, the foggy location can be continuously fine programmed if the data was saved in the SLC memory.

However, if at block 318, the controller determines the identified location at block 312 is not a foggy program location, then at block 322, then the data was being fine programmed to the QLC memory block location when the power loss event occurred at block 322. At block 324, the controller utilizes an error correction code (ECC) engine to read the last fine programmed wordline and check the bit error rate (BER) for the last fine programmed wordline.

At block 326, the controller determines if the BER is greater than or less than a predetermined threshold. The predetermined threshold may be a value set at the initiation of the data storage device or a configurable value that is adjusted through the life and operation of the data storage device, where the configurable value may be specific to the individual memory units of the NVM. Furthermore, if BER is greater than the predetermined threshold, then the controller may mark the block as a non-programmable location.

If the BER is less than the predetermined threshold at block 326, then at block 328, the controller is able to continuously use the QLC memory block for the subsequent program. However, if the BER is greater than the predetermined value at block 326, then at block 330, the SLC data for the QLC memory block location of the fine program is copied to another SLC backup location. The SLC data copied is for the wordline associated with the BER greater than the predetermined threshold. When the BER is greater than the predetermined threshold, the BER may be considered as an unacceptable BER (UBER).

At block 332, the QLC memory block is marked in the power loss table for the missing good data at the QLC memory block location. The power loss table may include the amount of blocks that have been affected by power loss and the backup data for the affected wordlines stored in the SLC backup location. Furthermore, the missing good data is stored in the SLC backup location, where the SLC backup location was programmed to at block 308. The QLC block, excluding the wordline associated with the UBER, may be continuously utilized for QLC read and write operations. At block 334, the controller issues a block-ready-alert to the host device, where the block-ready-alert signifies that the QLC memory block may be accessed again.

It is to be understood that the data storage device may permit the host device to continue to send read and write commands to other blocks of the data storage device between the block 312 and block 332.

Figure 4:
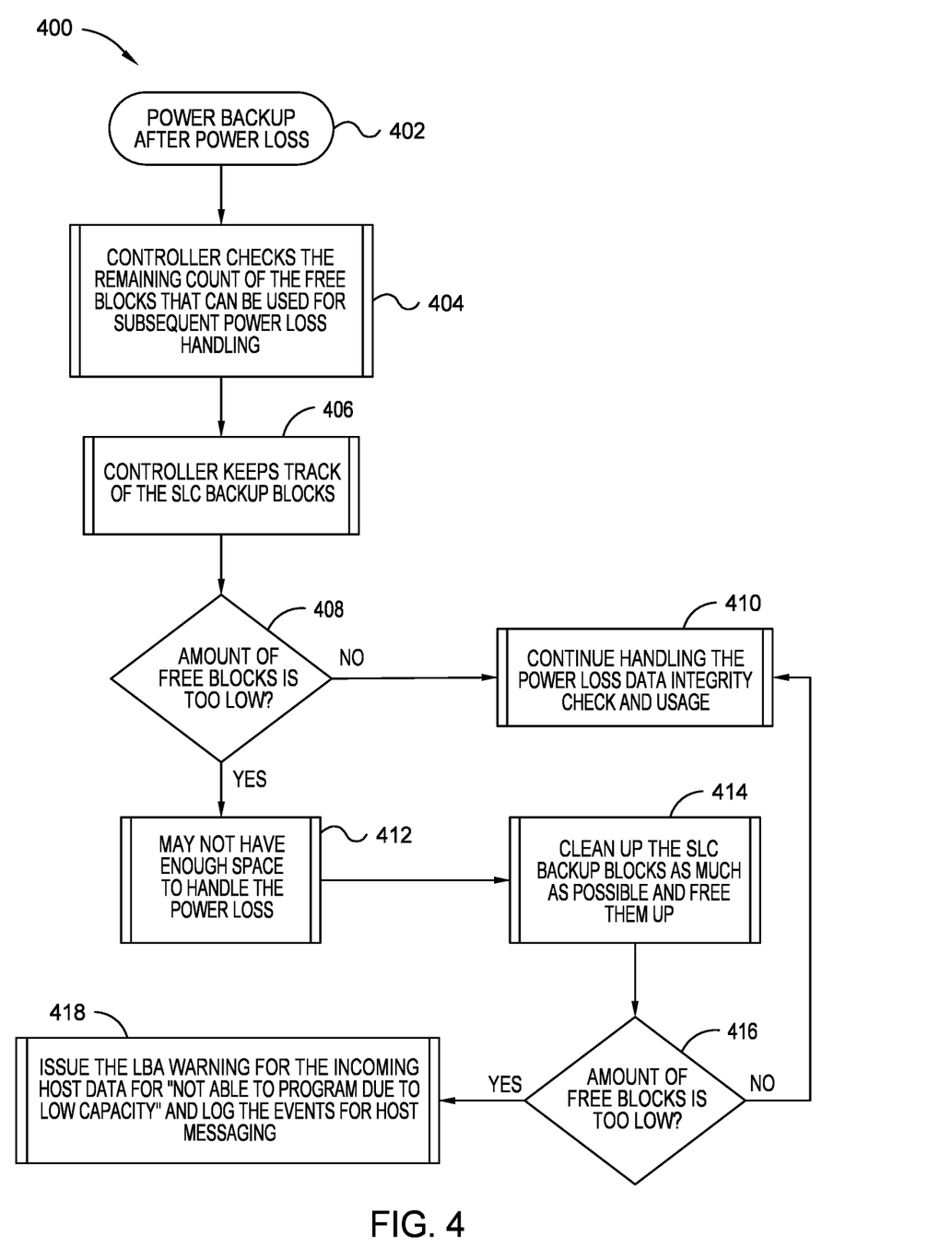
FIG. 4 is a flowchart of a method illustrating a check for power loss induced block exhaustion, according to one embodiment.

FIG. 4 is a flowchart of a method 400 illustrating a check for power loss induced block exhaustion, according to one embodiment. At block 402, the data storage device resumes operations after power is restored after a power loss event has occurred. At block 404, the controller checks the remaining count of the free blocks that can be used for subsequent power loss handling. The amount of free blocks may be blocks not programmed to or blocks not affected by power loss events. At block 406, the controller keeps track of the SLC backup blocks. At block 408, the controller determines if the amount of free blocks is too low. When determining if the amount of free blocks is too low, the controller may compare the amount of free blocks to a predetermined threshold of free blocks count.

If the amount of free blocks is not too low at block 408, then at block 410, the controller continues check for the power loss data integrity and usage. The check for the power loss data integrity and usage may be the method 300 of FIG. 3 previously described. However, if the amount of free blocks is too low at block 408, then at block 412, the controller determines that the NVM may not have enough memory space to handle the power loss. The determination may be a comparison of the current memory space to a predetermined threshold of free blocks count. At block 414, when the amount of free blocks count is less than the predetermined threshold of free blocks count (i.e., less free blocks available than required), the controller is configured to clean up the SLC backup blocks in order to free up memory for additional data to be stored to the SLC backup blocks region.

At block 416, the controller determines if the amount of free blocks after the clean-up operation is still too low. If the amount of free blocks is greater than the predetermined threshold value at block 416, then the controller continues check for the power loss data integrity and usage, where the check for the power loss data integrity and usage may be the method 300 of FIG. 3. However, if the amount of free blocks is less than the predetermined threshold of free blocks count at block 416, then the controller triggers a power-loss halt at block 418. The power-loss halt may include issuing a logical block address (LBA) warning for any incoming data from the host device. The LBA warning may include a "not able to program due to low capacity" message. Furthermore, the controller logs the events for host messaging when issuing the power-loss halt.

By alerting the host device that a QLC block that was being used prior to the UGSD event is experiencing an ongoing block recovery, as well as monitoring the amount of free blocks available, efficient use of the data storage device occurs.

In one embodiment, a data storage device comprises: a non-volatile memory device; and a controller coupled to the non-volatile memory device, wherein the controller is configured to: detect a power loss event during a programming operation to a block; issue a block busy alert to a host device upon power up after the power loss event; determine whether the block can still be continuously programmed; and issue a block ready alert to the host device. The controller is further configured to identify a location of programming for the block at the power loss event. The controller is further configured to determine whether the location is a foggy programmed location or a fine program location. The controller is further configured to read a wordline at the location and check a bit error rate for the wordline. The controller is further configured to determine whether a bit error rate for the block is above or below a threshold. The controller is further configured to mark the block in a power loss table for missing good data at a particular location. The missing good data for the particular location is stored in a SLC backup location. The controller is further configured to copy data from one SLC location to another SLC location upon determining that a bit error rate is too high for a location in the block that was being programmed at a time of the power loss event. The data storage device permits the host device to continue to use other blocks of the data storage device while the determining is ongoing.

In another embodiment, a data storage device comprises: a non-volatile memory device; and a controller coupled to the non-volatile memory device, wherein the controller is configured to: determine power on after a power loss event; check remaining count of free blocks that can be used for subsequent power loss handling; determine whether remaining amount of free blocks is above or below a threshold; and either: continue handling a power loss data integrity check and usage; or issue a logical block address (LBA) warning for any incoming data from a host device. The controller is further configured to keep track of a number of SLC backup blocks. The controller is further configured to continue handling the power loss data integrity check and usage upon determining that the remaining amount of free blocks is above the threshold. The controller is further configured to clean up SLC backup blocks upon determining that the remaining amount of free blocks is below the threshold. The controller is configured to determine whether the remaining amount of free blocks is above or below a threshold another time after cleaning up the SLC backup blocks. The controller is configured to issue the LBA warning upon determining that the remaining amount of free blocks is below the threshold the another time. Continue handling the power loss data integrity check and usage comprises issuing a block-busy-alert to the host device. The controller is further configured to determine whether a location in the block that was being programmed at the power loss event can be continuously programmed or needs to have the location noted as missing good data in a power loss table. The controller is further configured to issue a block-ready-alert to the host device upon determining the block can be programmed.

In another embodiment, a data storage device comprises: a non-volatile memory device; means to determine whether a block can be continuously programmed after a power loss event; and means to issue a block-busy-alert to a host device after the power loss event. The data storage device further comprises means to track free blocks available after the power loss event.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a non-volatile memory device; and
a controller coupled to the non-volatile memory device, wherein the controller is configured to:
detect a power loss event during a programming operation to a block;
issue a block-busy-alert to a host device upon power up after the power loss event, wherein the block-busy-alert indicates to the host device that the block associated with the block-busy-alert is not to be modified;
determine whether the block can still be continuously programmed; and
issue a block-ready-alert to the host device.

2. The data storage device of claim 1, wherein the controller is further configured to identify a location of programming for the block at the power loss event.

3. The data storage device of claim 2, wherein the controller is further configured to determine whether the location is a foggy programmed location or a fine program location.

4. The data storage device of claim 3, wherein the controller is further configured to read a wordline at the location and check a bit error rate for the wordline.

5. The data storage device of claim 1, wherein the controller is further configured to determine whether a bit error rate for the block is above or below a threshold.

6. The data storage device of claim 1, wherein the controller is further configured to mark the block in a power loss table for missing good data at a particular location.

7. The data storage device of claim 6, wherein the missing good data for the particular location is stored in a SLC backup location.

8. The data storage device of claim 1, wherein the controller is further configured to copy data from one SLC location to another SLC location upon determining that a bit error rate is too high for a location in the block that was being programmed at a time of the power loss event.

9. The data storage device of claim 1, wherein the data storage device permits the host device to continue to use other blocks of the data storage device while the determining is ongoing.

10. A data storage device, comprising:
a non-volatile memory device; and
a controller coupled to the non-volatile memory device, wherein the controller is configured to:
determine power on after a power loss event;
check remaining count of free blocks that can be used for subsequent power loss handling;
determine whether a remaining amount of free blocks is above or below a threshold; and either:
  continue handling a power loss data integrity check and usage, wherein handling the power loss data integrity check and usage comprises issuing a block-busy-alert to a host device, and wherein the block-busy-alert indicates to the host device that a block associated with the block-busy-alert is not to be modified; or
  issue a logical block address (LBA) warning to the host device for any incoming data from the host device, wherein the LBA warning is a low capacity message.

11. The data storage device of claim 10, wherein the controller is further configured to keep track of a number of SLC backup blocks.

12. The data storage device of claim 10, wherein the controller is further configured to continue handling the power loss data integrity check and usage upon determining that the remaining amount of free blocks is above the threshold.

13. The data storage device of claim 10, wherein the controller is further configured to clean up SLC backup blocks upon determining that the remaining amount of free blocks is below the threshold.

14. The data storage device of claim 13, wherein the controller is configured to determine whether the remaining amount of free blocks is above or below a threshold another time after cleaning up the SLC backup blocks.

15. The data storage device of claim 14, wherein the controller is configured to issue the LBA warning upon determining that the remaining amount of free blocks is below the threshold the another time.

16. The data storage device of claim 10, wherein continue handling the power loss data integrity check and usage comprises issuing a block-busy-alert to the host device.

17. The data storage device of claim 16, wherein the controller is further configured to determine whether a location in the block that was being programmed at the power loss event can be continuously programmed or needs to have the location noted as missing good data in a power loss table.

18. The data storage device of claim 17, wherein the controller is further configured to issue a block-ready-alert to the host device upon determining the block can be programmed.

19. A data storage device, comprising:
  memory means;
  a controller coupled to the memory means, the controller configured to:
    determine whether a block can be continuously programmed after a power loss event; and
    issue a block-busy-alert to a host device after the power loss event, wherein the block-busy-alert indicates to the host device that the block associated with the block-busy-alert is not to be modified.

20. The data storage device of claim 19, wherein the controller is further configured to track free blocks available after the power loss event.

* * * * *